United States Patent
Hill

(10) Patent No.: US 10,753,265 B2
(45) Date of Patent: Aug. 25, 2020

(54) EXHUAST AIR POLLUTION ELIMINATION DEVICE

(71) Applicant: Christopher Mark Hill, Scarborough (CA)

(72) Inventor: Christopher Mark Hill, Scarborough (CA)

( * ) Notice: Subject to any disclaimer, the term of this patent is extended or adjusted under 35 U.S.C. 154(b) by 0 days.

(21) Appl. No.: 16/413,972

(22) Filed: May 16, 2019

(65) Prior Publication Data

US 2020/0131973 A1    Apr. 30, 2020

Related U.S. Application Data

(60) Provisional application No. 62/753,418, filed on Oct. 31, 2018.

(51) Int. Cl.
| | |
|---|---|
| *F01N 13/04* | (2010.01) |
| *F01N 3/20* | (2006.01) |
| *F01N 5/04* | (2006.01) |
| *F01N 5/02* | (2006.01) |
| *F01N 3/01* | (2006.01) |

(52) U.S. Cl.
CPC ............ *F01N 13/04* (2013.01); *F01N 3/01* (2013.01); *F01N 3/2013* (2013.01); *F01N 5/025* (2013.01); *F01N 5/04* (2013.01); *F01N 2240/05* (2013.01)

(58) Field of Classification Search
CPC .......... F01N 13/04; F01N 3/01; F01N 3/2013; F01N 5/04; F01N 5/025; F01N 2240/05
USPC .......................................... 60/274, 317, 320
See application file for complete search history.

(56) References Cited

U.S. PATENT DOCUMENTS

| | | | |
|---|---|---|---|
| 3,157,479 A | 11/1964 | Boles | |
| 3,846,637 A | 11/1974 | Gettinger | |
| 5,284,556 A | 2/1994 | Rich | |
| 5,630,866 A | 5/1997 | Gregg | |
| 5,778,664 A | 7/1998 | Janata | |
| 6,012,283 A | 1/2000 | Miller | |
| 6,212,883 B1 | 4/2001 | Kang | |
| 6,224,653 B1 | 5/2001 | Pavlovich | |
| 6,432,280 B1 | 8/2002 | Bianco | |
| 7,650,953 B2 * | 1/2010 | Dong | B60K 6/52 180/65.21 |
| 8,281,579 B2 | 10/2012 | Driscoll | |
| 9,644,519 B2 * | 5/2017 | El Imam | F01N 13/08 |
| 2013/0276849 A1 * | 10/2013 | Kossakovski | H01L 35/32 136/201 |
| 2014/0238005 A1 * | 8/2014 | Bewlay | F28D 21/0003 60/320 |

(Continued)

*Primary Examiner* — Hoang M Nguyen
(74) *Attorney, Agent, or Firm* — Gutwein Law; Greg N. Geiser

(57) ABSTRACT

Described herein is an exhaust air pollution elimination device configured for attachment to an exhaust pipe of an internal combustion engine for removing pollutants from an exhaust flow. The device comprising multiple stages configured to both power the operation of the device and treat the exhaust flow. The device configured for installation in line with existing exhaust piping and through a pair of connecting rings. The multiple stages of the device including an electrostatic precipitator, a thermoelectric generator, an electromagnetic induction device, and a second container including a UV light source and micro fibrous mesh containing titanium dioxide.

17 Claims, 17 Drawing Sheets

(56) References Cited

U.S. PATENT DOCUMENTS

2015/0243866 A1* 8/2015 Iriyanna .................. H01L 35/02
  60/320

* cited by examiner

EXHUAST AIR POLLUTION ELIMINATION DEVICE

CROSS REFERENCE TO RELATED APPLICATIONS

This application claims priority to U.S. Provisional Patent Application No. 62/753,418 filed 31 Oct. 2018 to the above-named inventor and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The invention relates generally to an air pollution remediation device configured for attachment to a vehicle exhaust system.

BACKGROUND

As is widely known, during the combustion of fuel an internal combustion engine generates an exhaust that travels through a vehicle exhaust system where it is finally emitted into the atmosphere as an emission. The majority of these vehicle emissions are composed of nitrogen, water vapor, and carbon dioxide with smaller portions of this exhaust composed of undesirable and toxic components, such as particulates, carbon monoxide (generally from incomplete combustion), hydrocarbons (generally from unburnt fuel), and nitrogen oxides (generally from excessive combustion temperatures). These undesirable and toxic components are known pollutants and when present within the atmosphere extensively contribute to the proliferation of smog, formation of acid rain, greenhouse gasses, and can irritate airways in the human respiratory system.

Currently there are several solutions being developed and utilized to combat the proliferation and generation of these undesirable components and pollutants. One such solution is to eliminate or reduce the use of vehicles utilizing an internal combustion engine by biking, walking, carpooling, utilizing public transportation, driving low speed vehicles (LSV), and operating electric vehicles. Unfortunately, each of these solutions have drawbacks that prevent them from being permanent and large-scale solutions.

One other common solution is the use of a device, such as a catalytic converter, to alter or convert the harmful emissions at the molecular level. At its most basic, the catalytic converter uses heat and a structure, such as a mesh, having a large surface area that is comprised of and coated with a variety of molecules and elemental metals for generally participating as a catalyst in a redox reaction to remove the unwanted molecules and pollutants.

Although catalytic converters are generally useful for their intended purpose, they do have several drawbacks. First, to be efficient, the catalytic converter must be hot to enable the redox reaction required to clean the received exhaust. Accordingly, as the catalytic converter utilizes the heat of the exhaust for its operation, it is often inefficient when utilized on a cold engine at startup. This feature is particularly problematic as the most harmful emissions are generated upon the startup of a cold engine. Further, overtime catalytic converters have a tendency become poisoned wherein substances within the exhaust coat the working surfaces of the catalytic converter preventing the standard reaction. Still further, the inherent design properties of the catalytic converter may restrict the flow of exhaust from the engine resulting in power loss, wherein the overall horsepower of a given vehicle may be slightly reduced.

Therefore, there is a need within the marketplace for an improved pollution remediation device configured for placement in line with a vehicle exhaust system. Preferably, this device is reliable, efficient, and configured for easy installation onto an existing vehicle or other devices utilizing an internal combustion engine. Preferably, this device is configured for easy addition and removal for cleaning and maintenance and configured with features to enable operation without the addition of an external power source.

SUMMARY OF THE INVENTION

The device of the present disclosure is most generally configured as a pollution remediation device configured for placement in line with an internal combustion engine for removing particulate matter and airborne pollutants. The device is a multiple stage filter system configured to trap and catalyze vehicle exhaust in harmony with existing systems. The device is generally fitted at a pair of ends to an exhaust piping system of an engine through a pair of connecting ring portions. Each ring portion of the connecting ring portions having a spring member generally configured bias a second end to secure the main portions of the device to the exhaust piping and enabling secure installation and removal of the main portions of the device. Each ring portion of the connecting ring portions having a first end adapted for permanent securing, preferably through welding, to the exhaust piping, wherein each ring portion has the first end secured to the exhaust piping and the second end removably securing the main portions of the device to the vehicle.

The first stage of the multiple stages of the device is configured for placement proximal to the engine exhaust to remove particulate matter from the exhaust. The first stage, referred to as both the first container and the electrostatic precipitator, including a plurality of plates coupled to a voltage source for directing a charge to the plurality of plates. The plurality of plates charged to attract and collect suspended particulate as it passes through and across the surface area of the plurality of plates within the interior of the electrostatic precipitator of the device. The electrostatic precipitator configured with a plurality of supporting brackets allowing for removable receipt of the precipitator within the main portions of the device enabling the user to remove the precipitator for periodic cleaning.

The second stage of the multiple stages of the device is a pair of thermoelectric generators configured to function in the generation of electrical power for operation of the device. The pair of thermoelectric generators utilizing the difference of heat from an interior of the device to an exterior of the device. Each generator of the pair of thermoelectric generators positioned on opposed sides of a third stage in the form of an electromagnetic induction device of the multiple stages of the device, wherein each thermoelectric generator flanks the electromagnetic induction device.

The electromagnetic induction device utilizing the flow of the exhaust to generally power a pair of fan blades with attached accessories to generate additional electricity for use in operation of the device. The electromagnetic induction device in the preferred embodiment generally functioning as a turbine utilizing magnets in a magnetic coupling with a wrapped copper wire to generate a current for use within the device.

The fourth stage of the device, generally referred to as the second container, is configured for the removal of carbon dioxide ($CO_2$) and nitrogen oxides ($NO_x$). The second container including various pollution remediation devices operating in redundancy and concert to remove the pollutants. The first remediation solution being an intense ultra violet (UV) light source in combination with an internal structure impregnated and coated with titanium dioxide ($TiO_2$) to cleave and separate the carbon dioxide molecule into carbon and oxygen molecules. The second remediation solution being a micro fiber mesh wall impregnated and coated with titanium dioxide ($TiO_2$) to break apart the nitrogen oxides ($NO_x$) at the molecular level and provided as a redundant solution the first remediation solution.

The device function is preferably configured to utilize the various structures to self-generate the electricity necessary for the operation of the device. In an alternate embodiment, the device may include an external battery initiated upon motion of the device as an addition to provide additional power to the device if necessary.

The device fulfills the need for an air-pollution, acidification (land and water), and/or global warming remediation device that can be installed as an aftermarket accessory to any object utilizing an internal combustion engine.

Among other things, it is an advantage of the device to allow for customization in the form of optional colored features to match a vehicle the device is installed upon.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
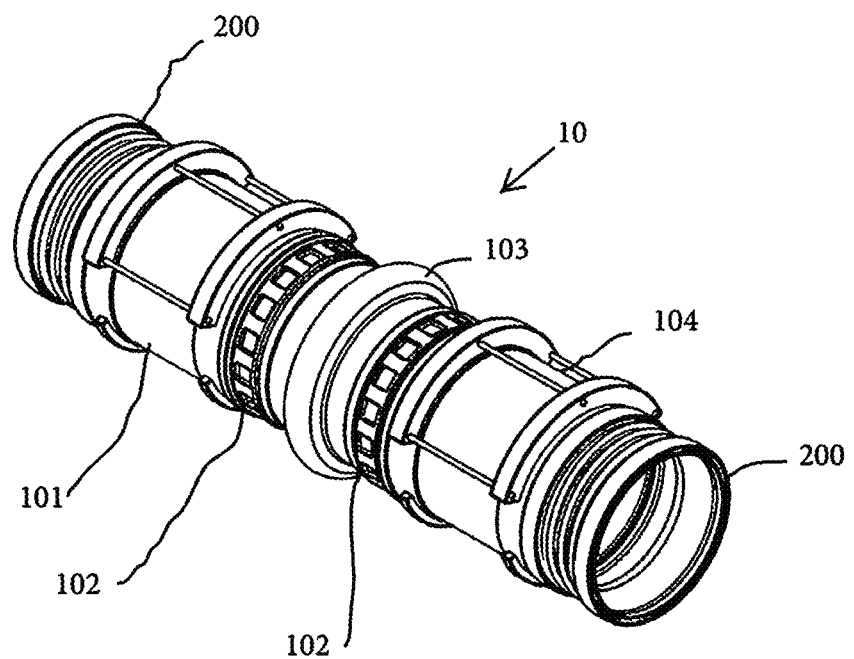
FIG. 1 shows a perspective view of device, according to the present disclosure.
Figure 2:
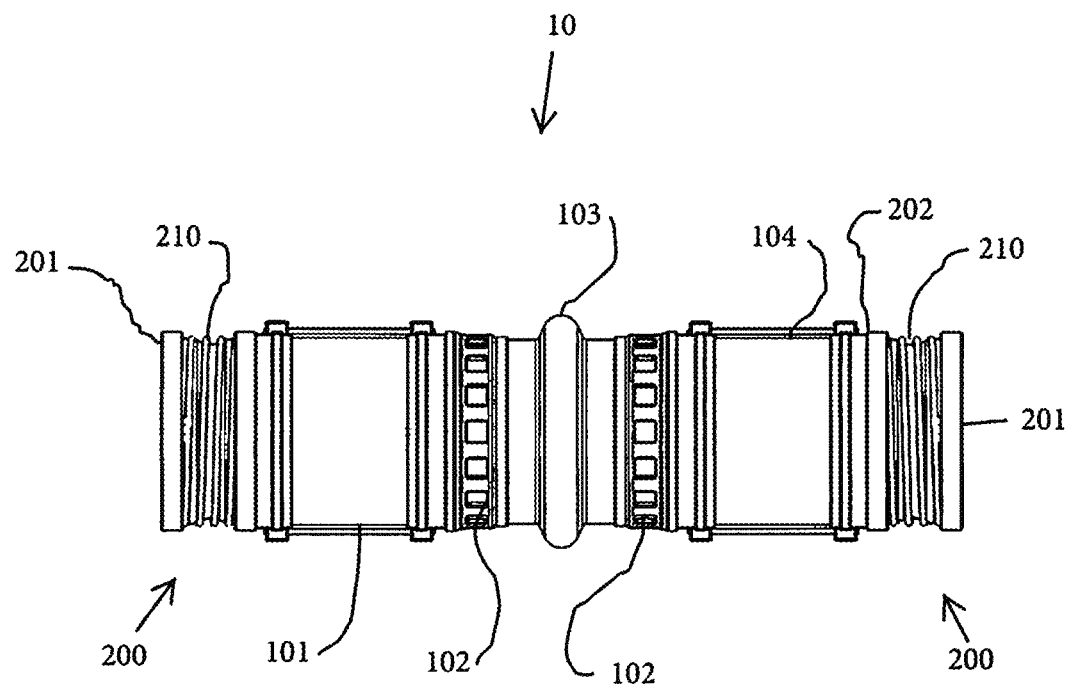
FIG. 2 shows a side view of device, according to the present disclosure.
Figure 3:
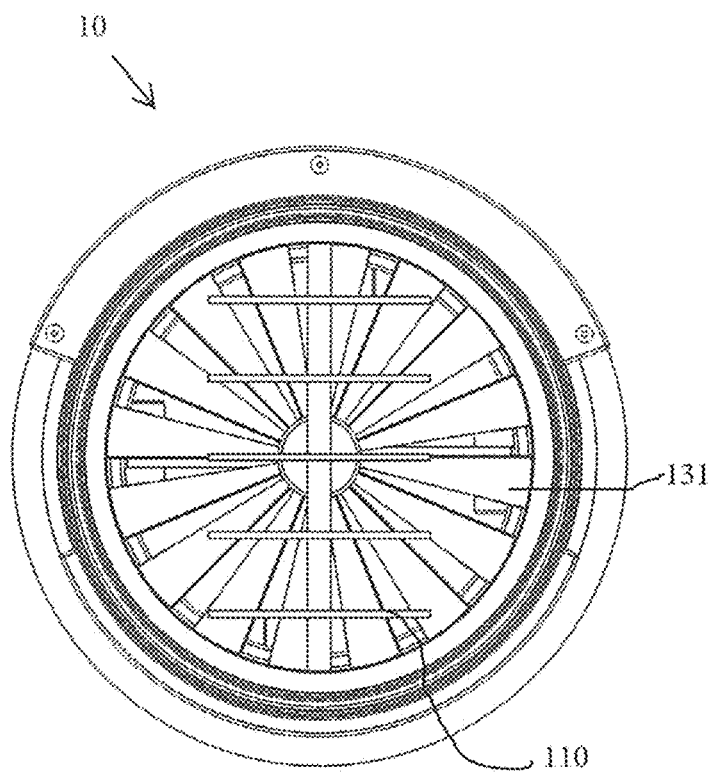
FIG. 3 shows an end view through the device interior, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The device of the present disclosure is most generally referred to as a multiple stage pollution remediation device for placement in line with an exhaust of an internal combustion engine and configured with multiple components to clean and remove pollutants from this exhaust.

The invention is an exhaust air pollution elimination device.

Referring to the figures, FIGS. 1-17 show various views of multiple stages of the device. The device of the present disclosure is a multiple stage filter system configured to trap, clean, and catalyze vehicle exhaust in harmony with existing systems and is generally referred to as device 10. The device 10 is designed for placement in line with an exhaust stream or exhaust flow of an internal combustion engine. Typically, to place the device 10 in line with the exhaust, a section or length of exhaust piping is removed corresponding to a length of the device 10.

Figure 4:
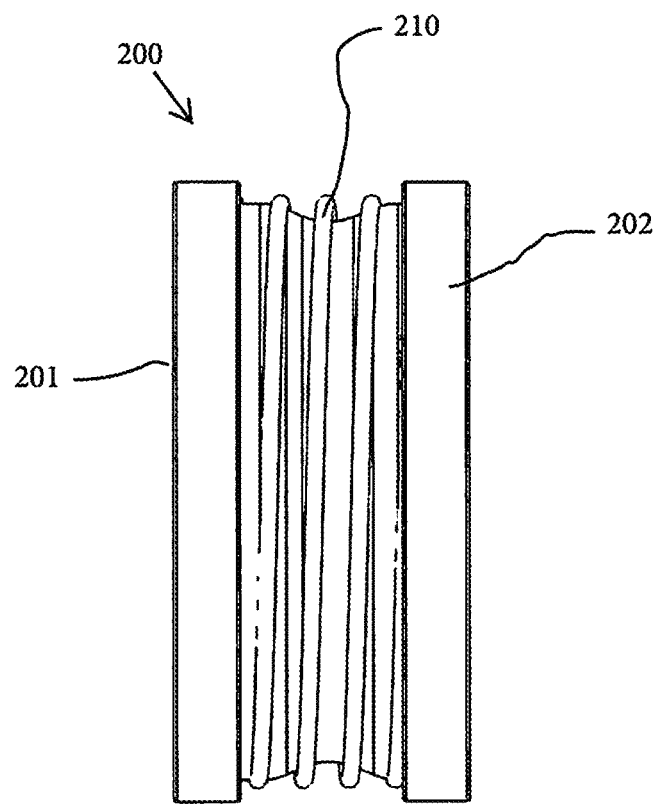
FIG. 4 shows a side view of one connecting ring of the pair of connecting rings, according to the present disclosure.
Figure 5:
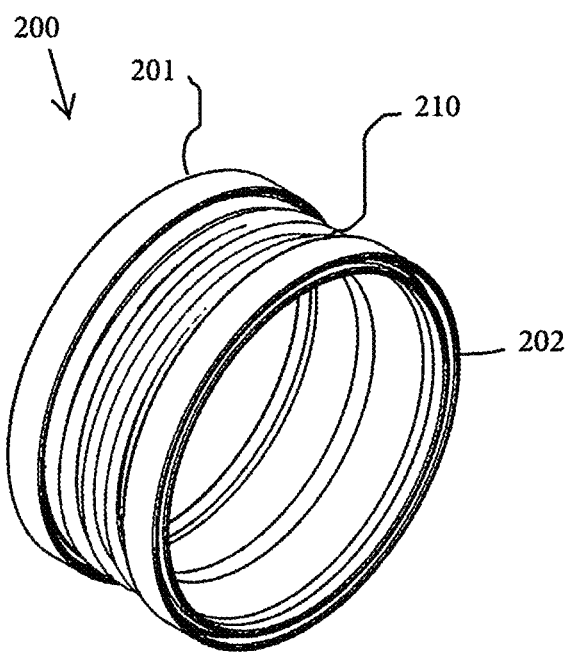
FIG. 5 shows an isometric view of one connecting ring of the pair of connecting rings, according to the present disclosure.

Referring now specifically to FIGS. 4-5, to facilitate this installation, the device 10 includes a pair of connecting ring portions 200. Each ring portion 200 of the connecting ring portions 200 having a first end 201, a second end 202 opposite the first end 201, and a spring member 210. The spring member 210 configured to bias the second end 202 in a direction parallel to the device 10 towards the first end 201. The movement of the second end 202 in concert with the spring member 210 configured to secure the main portions of the device 10 to the exhaust piping and enabling secure installation and removal of the main portions of the device 10.

The first end 201 of each ring portion 200 of the connecting ring portions 200 affixed to the exhaust piping section ends. In the preferred assembly, the first end 201 is permanently secured to the exhaust piping through welding, wherein each ring portion 200 has the first end 201 secured to the exhaust piping and the second end 202 removably securing the main portions of the device 10 to exhaust sections coupled to the internal combustion engine.

Figure 9:
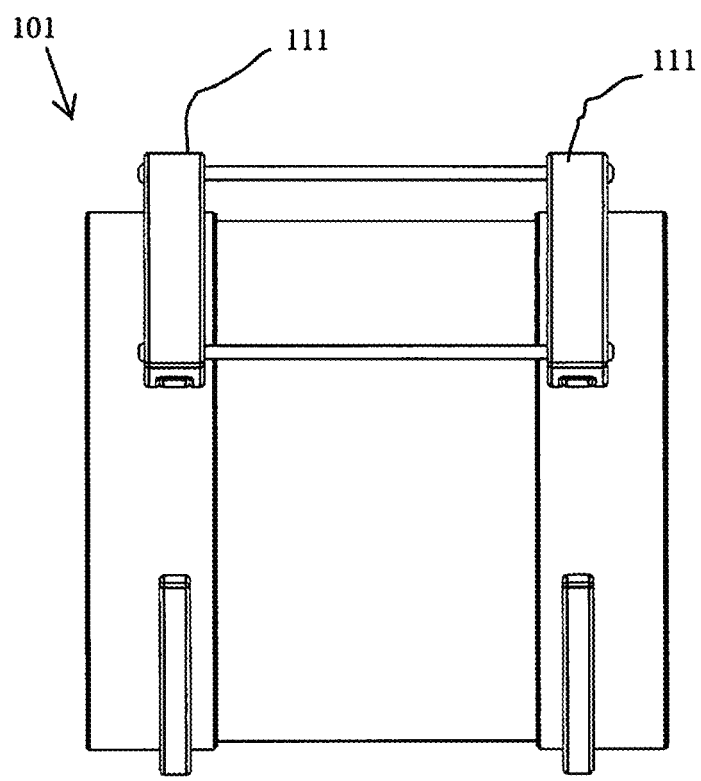
FIG. 9 shows a side view of the first stage of the device, according to the present disclosure.
Figure 10:
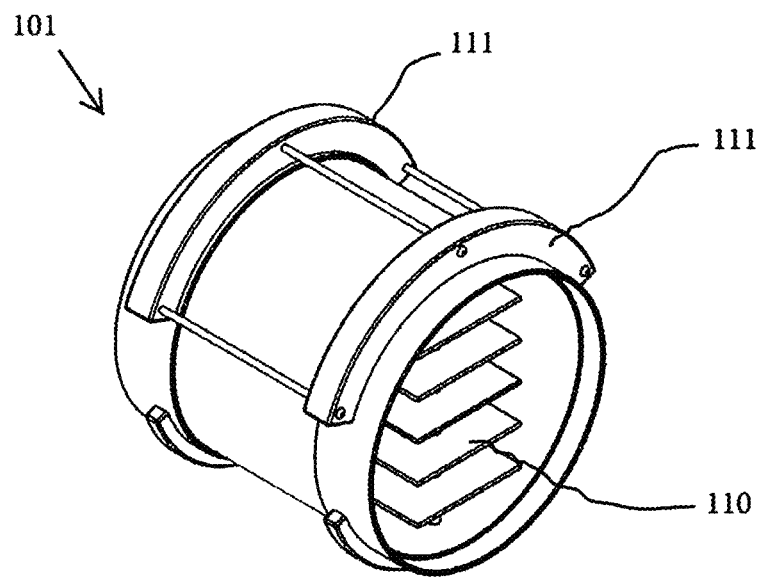
FIG. 10 shows an isometric view of the first stage of the device, according to the present disclosure.
Figure 11:
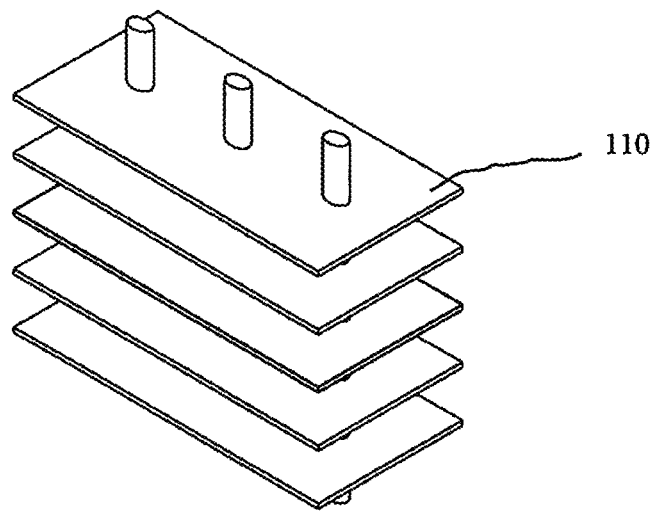
FIG. 11 shows an isometric view of the internal components of the first stage of the device, according to the present disclosure.

The device 10 is specifically sequenced in line with the exhaust flow, wherein multiple stages of the device 10 are configured for treatment of the exhaust flow in order. Referring now to FIGS. 9-11, the first stage 101 of the multiple stages of the device 10 is configured for placement proximal to the internal combustion engine exhaust to specifically remove particulate matter from the exhaust. The first stage 101, referred to as both the first container and the electrostatic precipitator, includes a plurality of plates 110 coupled to a power source for directing an electric charge to the plurality of plates 110. Each plate 110 of the plurality of plates 110 charged to attract and collect suspended particulate matter on the various surfaces of the plurality of plates 110 as the particulate matter passes through an interior of the first stage 101 and across the surface area of the plurality of plates 110 of the device 10.

The first stage 101 electrostatic precipitator further having a plurality of supporting brackets 111 removably securing the first stage 101 within the device 10. The supporting brackets 111 generally movable to allow for removal of the first stage 101 electrostatic precipitator. The removal of the first stage 101 through movement of the supporting brackets 111 allows a user of the device 10 to clean the first stage 101 electrostatic precipitator of particulate matter collected on the plurality of plates 110 to improve collection efficiency and efficacy. It is anticipated, that this cleaning of the first stage 101 electrostatic precipitator plates 110 will only need to be done periodically.

Figure 15:
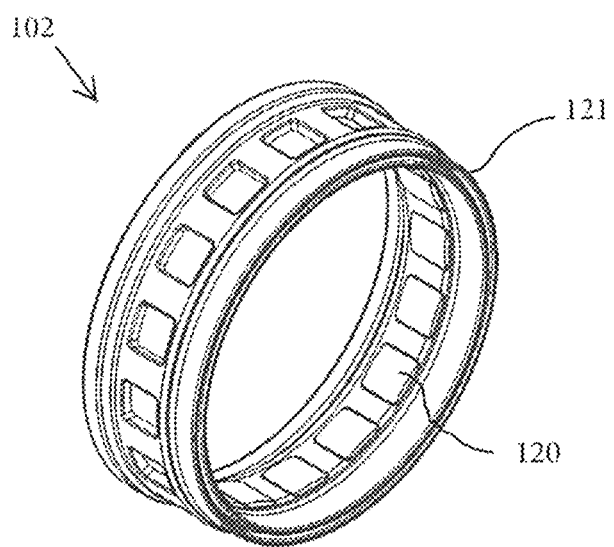
FIG. 15 shows an isometric view of one component of the second stage of the device, according to the present disclosure.
Figure 16:
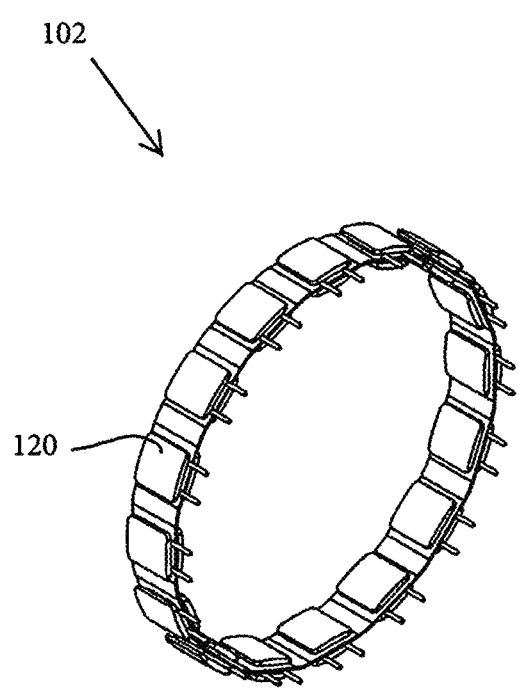
FIG. 16 shows an isometric view of some of the internal components of the second stage of the device, according to the present disclosure.
Figure 17:
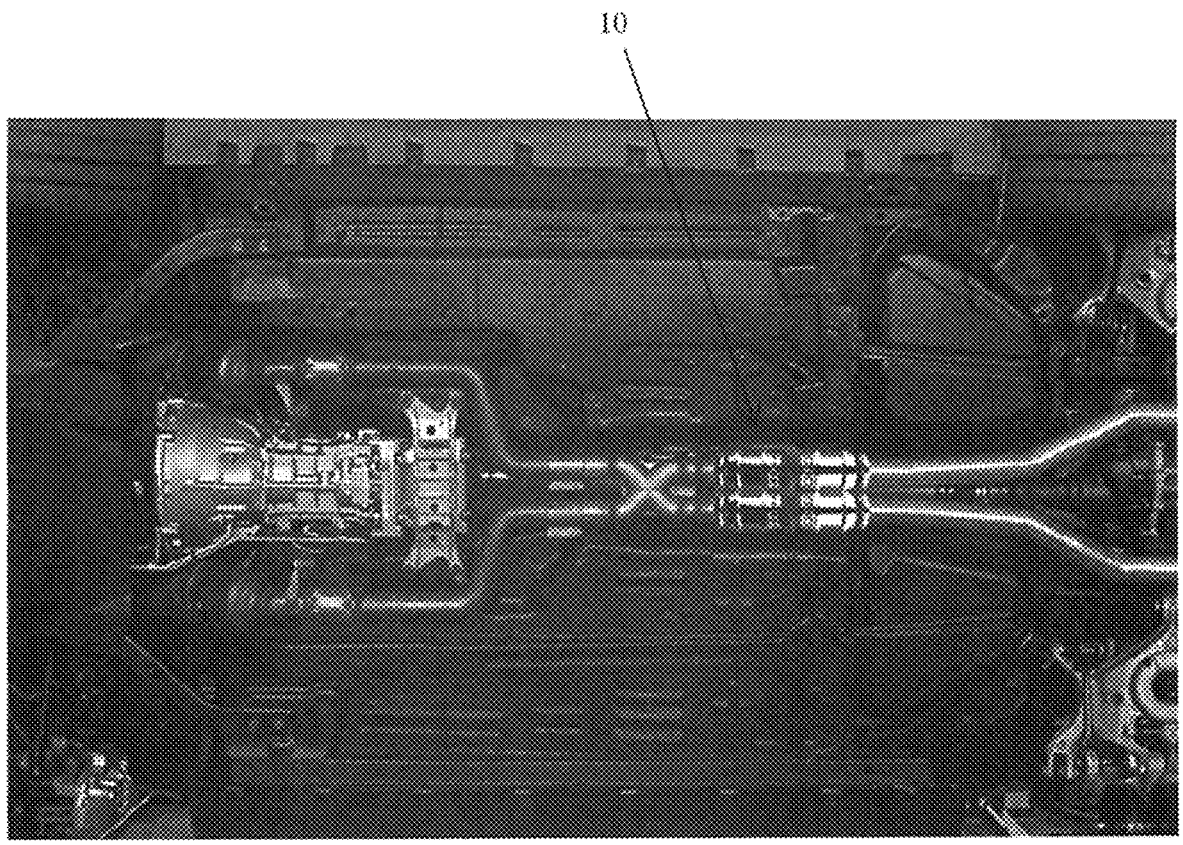
FIG. 17 shows an underside view of a vehicle with the device installed, according to the present disclosure.

Referring now to FIGS. 15-16, the second stage 102 of the multiple stages of the device 10 is provided in a pair of assemblies referred herein as a pair of thermoelectric generators 102. The thermoelectric generators 102 configured to utilize a temperature gradient to generate electrical power for use as the power source in operation of the various systems and features of the device 10. The pair of thermoelectric generators 102 generally ring shaped and aligned adjacent to the interior and an exterior of the device 10 to utilize the heat of the exhaust flow and the temperature differential between the exhaust flow at an interior of the device 10 and an ambient temperature at the exterior of the device 10 in the generation of electrical energy.

In the preferred embodiment of the device 10, each thermoelectric generator 102 of the pair of thermoelectric generators 102 is configured of a plurality of individual generators 120 placed within an annular housing 121 generally surrounding the exhaust flow. The individual generators 120 spaced around the housing 121 and configured to generate energy through the Seebeck effect, wherein heat flux is converted directly into electrical energy for use within the device 10 through various semiconductors and metal plates within in each generator 120 of the plurality of generators 120.

Each generator 102 of the pair of thermoelectric generators 102 positioned on opposed sides of a third stage 103 in the form of an electromagnetic induction device of the multiple stages of the device 10, wherein each thermoelectric generator 102 flanks the electromagnetic induction device 103.

Figure 6:
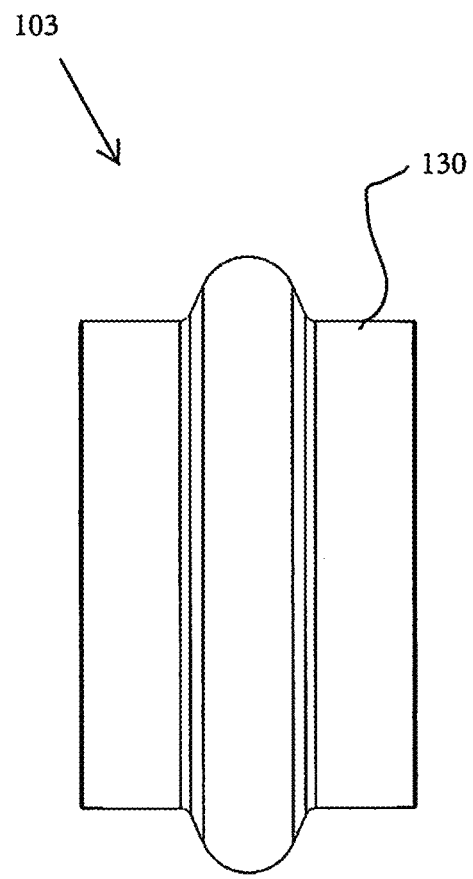
FIG. 6 shows a side view of an exterior of the third stage of the device, according to the present disclosure.
Figure 7:
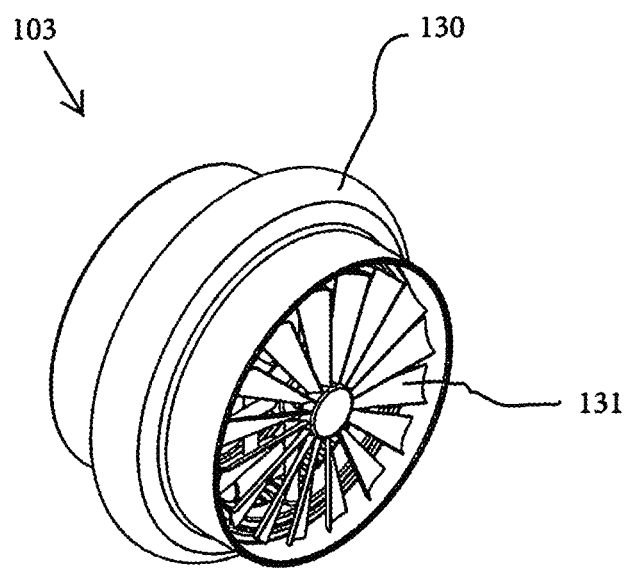
FIG. 7 shows an isometric view of the third stage of the device, according to the present disclosure.
Figure 8:
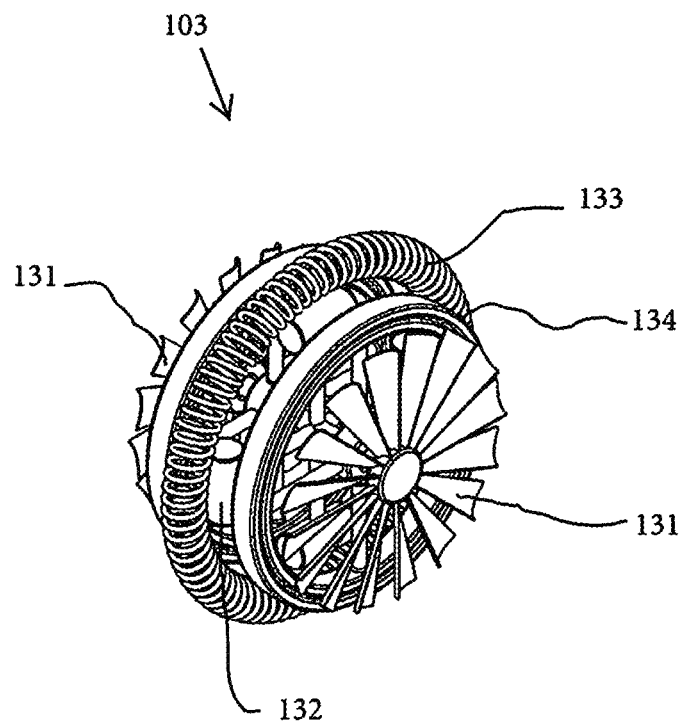
FIG. 8 shows an isometric view of the internal components of the third stage of the device, according to the present disclosure.

Referring now to FIGS. 6-8, the electromagnetic induction device 103 utilizing the flow of the exhaust to generally power a pair of fan blades 131 with attached accessories to generate additional electricity for use as the power source in operation of the device 10. The electromagnetic induction device 103 generally having a housing 130 shaped to contain and protect the internal and working components of the induction device 103.

In the preferred embodiment of the present disclosure, the working components of the induction device 103 generally function as a turbine by utilizing a plurality of magnets 132 in coupled to the pair of fan blades 131 and in a magnetic coupling with a wrapped copper wire 133 to generate a current for use within the device 10. Accordingly, rotational movement of the pair of fan blades 131 is translated to the plurality of magnets 132 through a shaft adjacent to the copper wire 133. To facilitate smooth rotation of the pair of fan blades 131 a plurality of ball bearings 134 are used in a coupling with the shaft adjacent to each fan blade 131 of the pair of fan blades 131 to smoothly translate movement of the blades 131 to the magnets 132.

Figure 12:
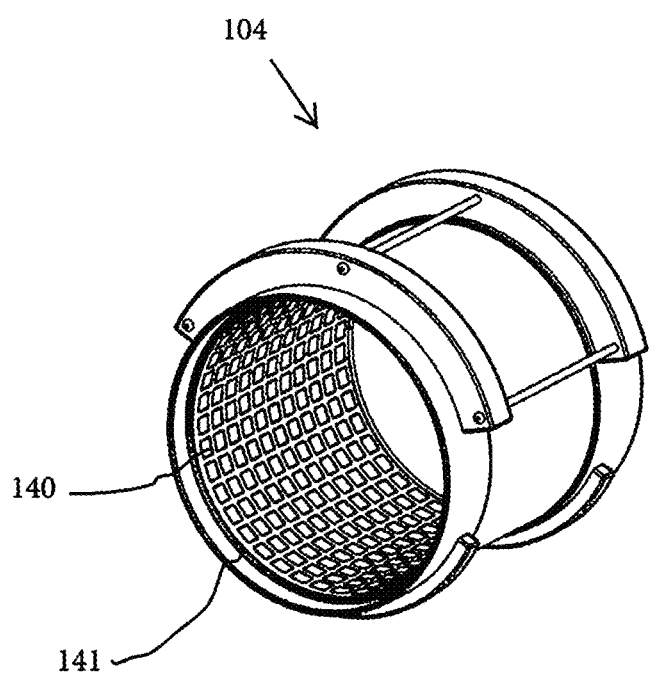
FIG. 12 shows an isometric view of the fourth stage of the device, according to the present disclosure.
Figure 13:
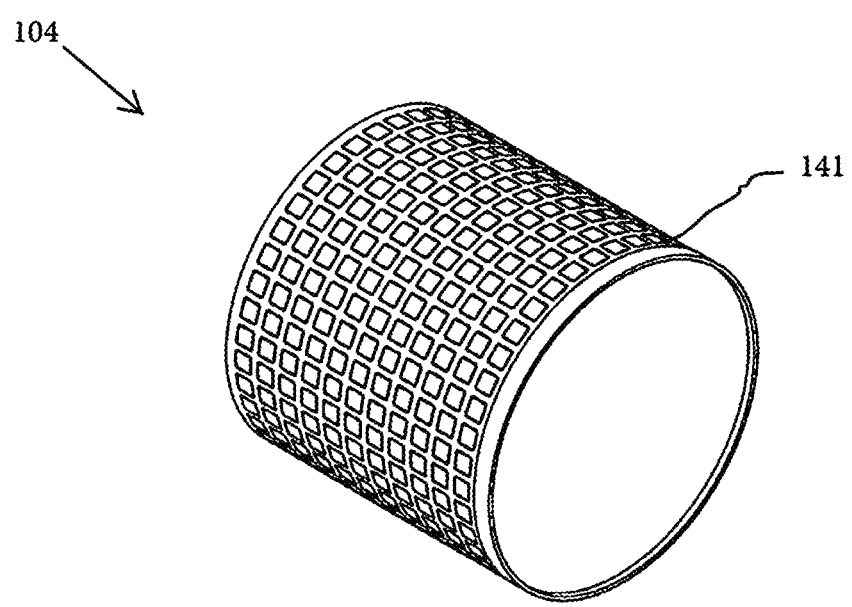
FIG. 13 shows an isometric view of some of the internal components of the fourth stage of the device, according to the present disclosure.
Figure 14:
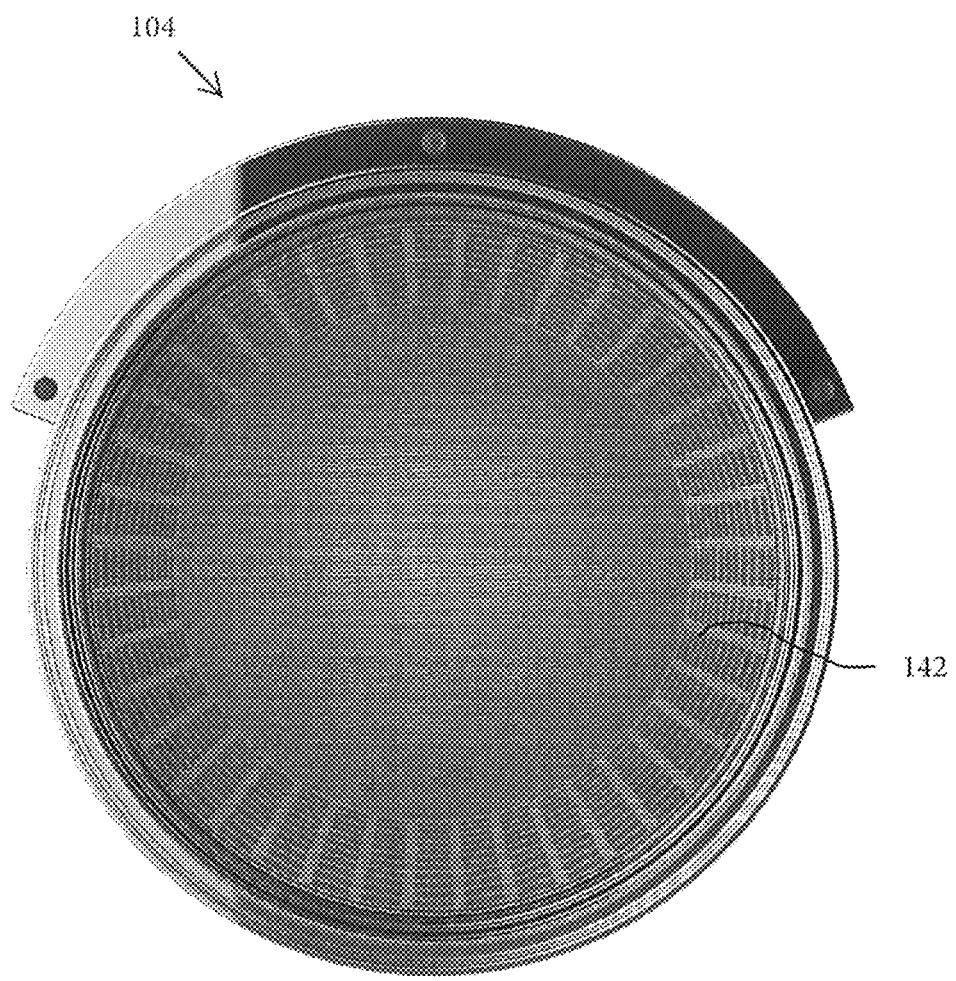
FIG. 14 shows an end view of the internal components within the interior of the fourth stage of the device, according to the present disclosure.

Referring now to FIGS. 12-14, the fourth stage of the device 104, generally referred to as the second container 104, is configured for the removal of carbon dioxide ($CO_2$) and nitrogen oxides ($NO_x$). The second container 104, including a plurality of pollution remediation devices operating in redundancy and concert to remove the pollutants. The second container 104 generally functioning as a housing enclosing an interior space containing the exhaust flow as it exits the previous stages of the device 10 distal to the internal combustion engine. The first remediation solution being an intense ultra violet (UV) light source 140 to cleave and separate the carbon dioxide molecule into carbon and oxygen molecules. The UV light source 140 generally being directed through a tubular shaped-grid 141 comprised of a coating of a material including titanium dioxide ($TiO_2$). The titanium dioxide ($TiO_2$) grid 141 configured to break apart the nitrogen oxides ($NO_x$) at the molecular level. In addition to the tubular shaped-grid 141, an additional and secondary remediation device in the form of a micro fiber mesh wall 142 positioned at an exit of the device 10 tubular structure as a last step in the treatment of the exhaust flow. To further improve remediation this micro fiber mesh wall 142 may also include a coating of titanium dioxide ($TiO_2$) to further catalyze the $CO_2$ and NOx molecules within the exhaust flow.

The device 10 function is preferably configured to utilize the various structures within the device 10 to self-generate the electricity necessary for the operation of the device 10 through use of the pair of thermoelectric generators 102 and magnetic induction device 103. In an alternate embodiment, the device 10 may include an external power source, such as, but not limited to a battery (not pictured) that is initiated upon motion of exhaust flow within the device 10 as an addition to provide additional and supplemental power to the device 10 if necessary.

The device 10 fulfills the need for an air-pollution, acidification (land and water), and/or global warming remediation device that can be installed as an aftermarket accessory to any object utilizing an internal combustion engine.

It is further an advantage of the device 10 to allow for customization of an exterior appearance of the various housing of the multiple stages of the device 10, wherein a user of the device 10 could select a given color of one of or several of the stages of the multiple stages to match or coordinate with a given vehicle the device 10 is installed upon.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. An air pollution remediation device configured for installation in line with the exhaust piping of an exhaust stream from an internal combustion engine, the device comprising:
   a pair of connecting rings, each ring of the pair of connecting rings positioned on the exhaust piping at an opposed end of the device;
   a first container positioned proximal to the internal combustion engine adjacent to a first ring of the pair of connecting rings, the first container including a plurality of electrically charged plates configured to attract particulate matter from the exhaust stream;
   a pair of thermoelectric generators, each thermoelectric generator of the pair of thermoelectric generators ring shaped and aligned adjacent to an interior of the device and an exterior of the device to utilize the exhaust stream in generating electricity, the pair of thermoelectric generators in electric coupling with the device to provide power to the device systems;
   an electromagnetic induction device, the electromagnetic induction device comprising a pair of fan blades configured to rotate in response to the exhaust flow configured to generate electricity, the electromagnetic induction device in electric coupling with device to provide power to the device systems; and
   a second container positioned distal the first container relative to the internal combustion engine, the second container including an ultra violet (UV) light source directed at the exhaust flow within an interior of the second container configured to remove pollutants.

2. The air pollution remediation device as in claim 1, wherein the first container includes a plurality of supporting brackets, the supporting brackets movable, wherein the first container is removable from the device to facilitate cleaning.

3. The air pollution remediation device as in claim 1, wherein the second container includes a tubular shaped grid within the interior, the tubular shaped grid comprised of coating of titanium dioxide ($TiO_2$).

4. The air pollution remediation device as in claim 3, wherein the interior includes a micro fiber mesh wall positioned adjacent an exit of the device, the micro fiber mesh wall comprised of a coating of titanium dioxide ($TiO_2$).

5. The air pollution remediation device as in claim 1, wherein the device includes an external power source.

6. The air pollution remediation device as in claim 5, wherein the external power source is a battery.

7. The air pollution remediation device as in claim 1, wherein each thermoelectric generator of the pair of thermoelectric generators is comprised of a plurality of individual generators positioned within an annular housing surrounding the exhaust stream.

8. The air pollution remediation device as in claim 1, wherein each thermoelectric generator of the pair of thermoelectric generators is positioned on an opposed end of the magnetic induction device.

9. An air pollution remediation device configured for installation in line with the exhaust piping of an exhaust stream from an internal combustion engine, the device comprising:
- a pair of connecting ring portions, each ring of the pair of connecting ring portions positioned on the exhaust piping at an opposed end of the device, each ring of the pair of connecting ring portions including:
  - a first end, the first end fixed to an end of the exhaust piping;
  - a second end opposite the first end; and
  - a spring member, the spring member biasing the second end relative to the first end directionally parallel to the exhaust flow to allow removal of the device;
- a first container positioned proximal to the internal combustion engine adjacent to the second end of a first ring of the pair of connecting rings, the first container including:
  - a plurality of charged plates, the plurality of charged plates in an electrical coupling with a power source;
  - a plurality of supporting brackets, the plurality of supporting brackets removably securing the first container to the device, wherein the first container can be removed for cleaning of the plurality of charged plates;
- a pair of thermoelectric generators, each thermoelectric generator of the pair of thermoelectric generators functioning as the power source, each thermoelectric generator of the pair of thermoelectric generators including:
  - an annular housing surrounding the exhaust flow and aligned with an interior of the device and an exterior of the device; and
  - a plurality of individual thermoelectric generators, the plurality of thermoelectric generators received within the housing and configured to generate an electrical charge from temperature difference from the device interior and exterior;
- an electromagnetic induction device, the electromagnetic induction device functioning as the power source in a coupling with the device, the electromagnetic induction device including:
  - a housing; the housing shaped to contain the electromagnetic induction device;
  - a pair of fan blades received within the housing, each fan blade of the pair of fan blades rotating in response to the exhaust flow to generate electricity;
  - a plurality of magnets coupled to the fan blades to move in concert with the pair of fan blades; and
  - a copper wire, the copper wire surrounding the plurality of magnets and in magnetic coupling, wherein rotational movement of the pair of fan blades generates a current; and
- a second container, the second container positioned distal to the first container relative to the internal combustion engine, the second container including:
  - an ultra violet (UV) light source directed at the exhaust flow within an interior of the second container configured to remove pollutants; and
  - a tubular shaped grid within the interior, the tubular shaped grid comprised of coating of titanium dioxide (TiO$_2$).

10. The air pollution remediation device as in claim 9, wherein the second container interior includes a micro fiber mesh wall positioned adjacent an exit of the device, the micro fiber mesh wall comprised of a coating of titanium dioxide (TiO$_2$).

11. The air pollution remediation device as in claim 9, wherein the device includes an external power source.

12. The air pollution remediation device as in claim 11, wherein the external power source is a battery.

13. The air pollution remediation device as in claim 9, wherein each thermoelectric generator of the pair of thermoelectric generators is positioned on an opposed end of the magnetic induction device.

14. The method of removing pollution and contaminants from an exhaust stream of an exhaust pipe for an internal combustion engine with a pollution remediation device, the pollution remediation device having a first container including a plurality of charged plates, a pair of thermoelectric generators, a magnetic induction device, and a second container including a UV light source, the method steps comprising:
- removing a section of the exhaust pipe corresponding to a length of the pollution remediation device forming a gap within the exhaust pipe having a first edge and a second edge spaced apart the first edge of a length of the gap;
- securing a first end of a first connecting ring to the first edge;
- securing a first end of a second connecting ring to the second edge; and
- installing the pollution remediation device within the gap by aligning the first container with a second end and biasing a spring of the second end of the first connecting ring and aligning the second container with a second end and biasing a spring of the second end of the second connecting ring for securing the pollution remediation device in line with the exhaust stream.

15. The method of claim 14, wherein the second container includes a tubular shaped grid, the tubular shaped grid comprised of coating of titanium dioxide (TiO$_2$).

16. The method of claim 15, wherein the second container includes a micro fiber mesh wall positioned adjacent an exit of the device, the micro fiber mesh wall comprised of a coating of titanium dioxide (TiO$_2$).

17. The method of claim 14, wherein the device includes an external power source.

\* \* \* \* \*